United States Patent [19]
Ito et al.

[11] 3,940,176
[45] Feb. 24, 1976

[54] VEHICLE BODY CONSTRUCTION
[75] Inventors: Hiroshi Ito; Seikichi Yoshitsugu, both of Tokyo, Japan
[73] Assignee: Nissan Motor Co., Ltd., Yokohama Japan
[22] Filed: June 10, 1974
[21] Appl. No.: 478,042

[30] Foreign Application Priority Data
June 12, 1973  Japan............................ 48-69997
June 21, 1973  Japan............................ 48-73674
June 26, 1973  Japan............................ 48-75606

[52] U.S. Cl.............................. 296/28 F; 180/64 R
[51] Int. Cl.² ........................................ B62D 27/00
[58] Field of Search............ 296/28 F, 35 B, 28 R; 280/106 R; 180/64 R, 64 M; 248/3

[56] References Cited
UNITED STATES PATENTS
1,290,939   1/1919   Dyke............................ 280/106 R
2,856,226  10/1958   Purdy............................ 296/28 F
2,954,998  10/1960   Kushler et al. ................. 296/28 F
3,321,235   5/1967   Muller et al. ................... 296/28 R
3,596,978   8/1971   Wessells et al. ................. 296/28 R
3,718,364   2/1973   Fischer et al. .................. 296/28 R
3,791,472   2/1974   Tatsumi....................... 296/28 F X FOREIGN PATENTS OR APPLICATIONS
666,023   5/1929   France........................ 296/28 R
875,928   7/1942   France........................ 296/28 R Primary Examiner—Robert J. Spar
Assistant Examiner—Donald W. Underwood

[57] ABSTRACT

A unitized body construction incorporating longitudinal and lateral reinforcing members providing also yieldable shock absorbing members.

3 Claims, 12 Drawing Figures

VEHICLE BODY CONSTRUCTION

The present invention relates in general to a unitized body construction of a motor vehicle, and particularly to an improved construction of the front section of the body to secure survival space for the passengers in a collision.

When an automobile is involved in a head-on collision at high speed, various impact forces are applied on varied portions of the vehicle body. In a head-on collision, the impact forces produced will naturally result in heavy deformation or buckling of the front section of the body. A variety of reinforcing and shock absorbing constructions have been proposed and developed which are intended to absorb impact forces to prevent the vehicle front from being seriously deformed to protect the passengers of the vehicle.

In designing a collision collapse-resistant vehicle front prime consideration should, of course, be given to passenger protection.

In general, the designed strength of a vehicle body may be shared partly by the roof and side constructions of the body, but mainly by the construction of floor members. It is the modern and established practice to design and construct an integral, or a unitized body wherein the body and frame are made in one unit. The floor construction is thus proportionally the most important in the share of the constructional strength of a vehicle body, and therefore, there have been proposed a variety of floor constructions of reinforcing and shock absorbing character.

A typical conventional construction of the front floor section is illustrated in FIGS. 1 and 2, wherein a front floor member 10 secures on its upper surface, a cross member 12 extending laterally to constitute a reinforcing member of box-shaped cross section, a fire wall or dashboard panel 14 is secured to the front floor member 10, two dash side members 16 secured onto the lower surface of the dashboard panel 14 separate from each other and extending in the longitudinal direction of the vehicle constituting a reinforcing member of box-shaped cross section, and two front floor side members 18 secured to both lateral sides of the front floor member 10 and having a box-shaped cross section, wherein both ends of the above-mentioned cross member 12 are secured to the lateral sides of the front floor side members 18. In section in FIG. 2, a cowl box 20, which is composed of an upper member 20a and a lower member 20b is shown.

Since such longitudinal and lateral reinforcing members of the vehicle cabin as the dash side members 16 and the cross member 12 are separated from each other, in a head-on collision of a motor vehicle, deformation, buckling or collapse in the bent sections P1 and P2 of discontinuous construction of the fire wall or dashboard panel 14 may occur.

It is therefore a primary object of the present invention to provide an improved and useful reinforcing construction of the front floor section of a vehicle which provides a continuous or integral joint construction between the dashboard panel and the front floor member to prevent any stress concentration in such a joint construction and to absorb such stresses caused in a collision minimizing the deformation or buckling of such floor construction, thus securing a survival space for the passengers in the vehicle cabin.

It is another object of this invention to provide an improved and useful reinforcing construction of the front floor section of a vehicle body which provides a right-angled connection both in the central portion and the lateral side portions of a vehicle floor, so that both longitudinal and lateral reinforcing members may continuously be jointed with each other in the front floor section of the vehicle, thereby improving substantially the rigidity of the entire vehicle floor construction against any of or combinations of buckling and/or torsional stresses in the longitudinal and lateral directions caused by a head-on collision, thus minimizing local deformation or buckling of the front floor section of the passenger cabin.

It is still another object of this invention to provide an improved and useful reinforcing construction of the front floor section which provides a construction of box-shaped and further curvilinear cross section stemming from the front floor section and rising up to the dashboard panel section to dissipate any stresses rendered in the longitudinal direction in the front floor section to the cooperating floor members therewith, and eventually minimizing local deformation or buckling of the front floor section.

It is still a further object of this invention to provide improved and useful shock absorbing members on the lateral sides of the engine room of a vehicle having box-shaped cross sections and shallow portions which may respond to predetermined impact loads so that they may buckle or deform without difficulty when exposed to such impact loads rendered in the longitudinal direction and thus may absorb such impact loads.

According to this invention there is provided an improved and useful reinforcing and shock absorbing construction of the front floor section of a motor vehicle, which comprises a fire wall or dashboard panel separating the passenger cabin from the engine room, a front floor member, a cross member extending in the lateral direction of the vehicle body and connected to the floor member, two side members with the leading ends thereof extending and connected to the dashboard panel and with the tail ends thereof extending to reach the cross member and connected thereto, and two front floor side members extending in the longitudinal direction and along the both lateral sides of the front floor member and connected thereto, whereby, in a collision, the front floor member, the dash side members and front floor side members constitute a rigid construction of box cross section to improve the rigidity of the floor members against the stresses applied in the longitudinal direction, and the cross member, the dash side members and the front floor side members constitute a right-angled joint of rigid construction to improve the rigidity of the floor members against the stresses applied in the lateral direction, such that stresses may be jointly shared by such constituent members, thus minimizing deformation of the vehicle body and assuring the safety of the passengers in a collision.

The foregoing objects, characteristics, principle, and details of the present invention, as well as further objects and advantages thereof, will become more apparent from the following detailed descriptions with respect to preferred embodiments of the invention when read in conjunction with the accompanying drawings, in which like parts are designated by like reference numerals.

The construction and function of a reinforcing and shock absorbing construction of the front floor section of a motor vehicle according to this invention will now be described in details with respect to preferred embodiments thereof in conjunction with the accompanying drawings.

Referring to the accompanying drawings, there are shown reinforcing constructions of the front floor section and the cooperative side constructional members of a motor vehicle according to this invention. A fire wall or dashboard panel separating the passenger cabin from the engine room reaches a cross member which extends in the lateral direction of the vehicle body (hereinafter simply referred to as "the lateral direction" or "laterally") to the full width of the front floor of the cabin, and in which two dash side members secured to the back surface of the dashboard panel extend in the longitudinal direction of the body (hereinafter simply referred to as "the longitudinal direction" or "longitudinally") at least to an extent enough to reach the cross member and is secured to the front floor member, thereby providing the entire floor construction with a higher rigidity against buckling and/or torsional stresses applied upon the vehicle body.

Figure 1:
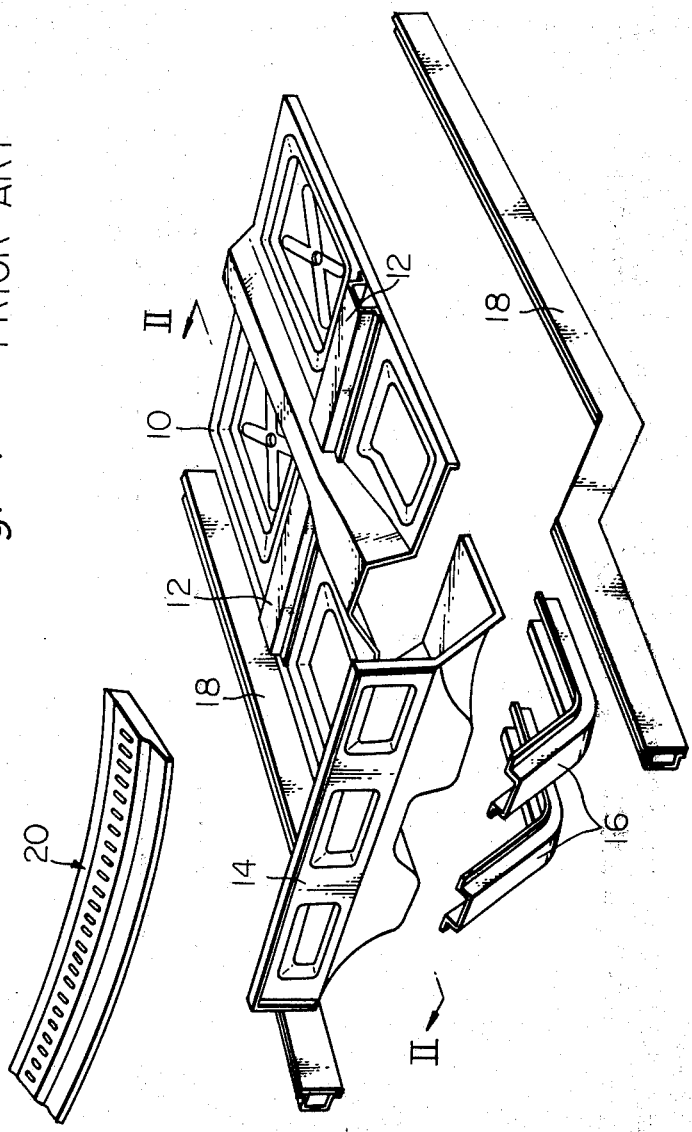
FIG. 1 is an exploded perspective view showing a conventional arrangement of front floor members of a motor vehicle.
Figure 2:
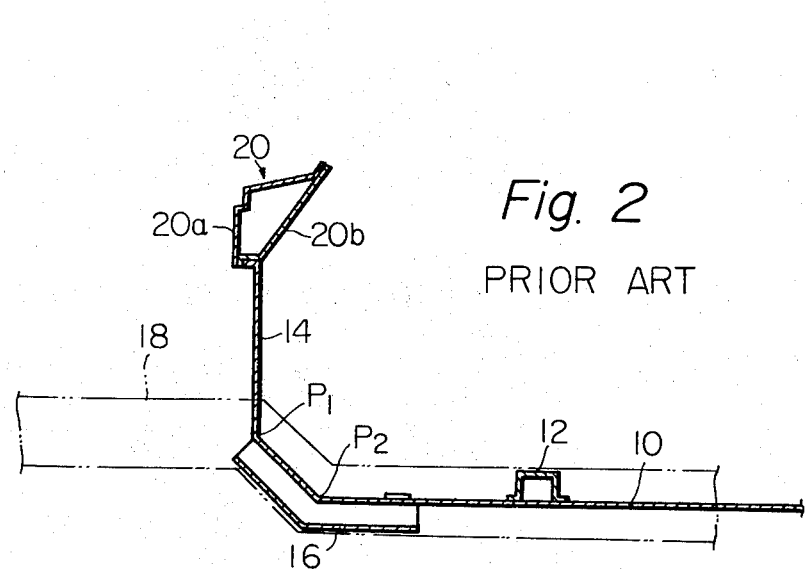
FIG. 2 is a longitudinal section view taken along the plane designated by the line II—II in FIG. 1 showing a general arrangement of the front floor members of FIG. 1.
Figure 3:
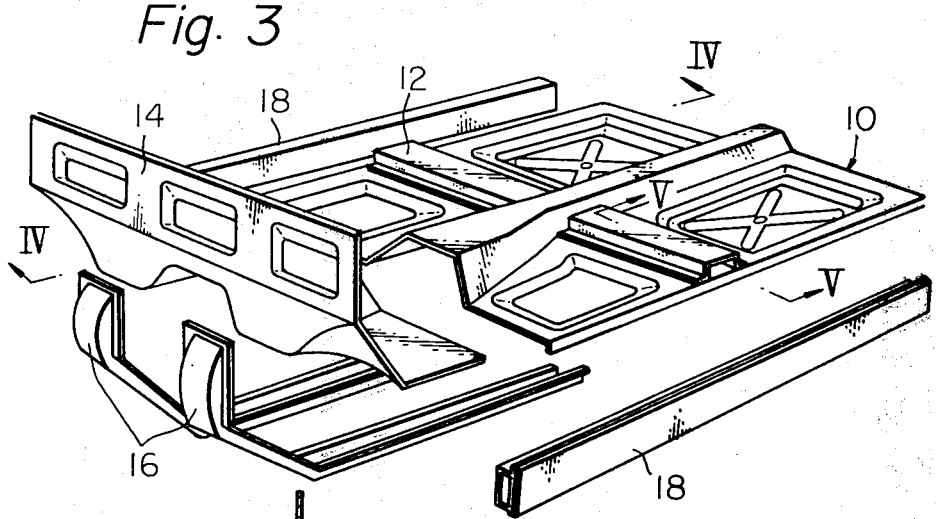
FIG. 3 is an exploded perspective view showing a first preferred embodiment of front floor members of a motor vehicle according to this invention.
Figure 4:
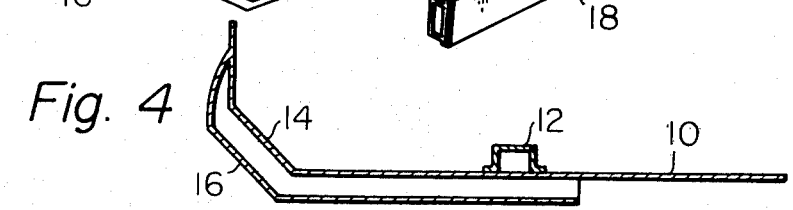
FIG. 4 is a longitudinal section view taken along the plane designated by the line IV—IV in FIG. 3 showing the general arrangement of the front floor members of FIG. 3.
Figure 5:
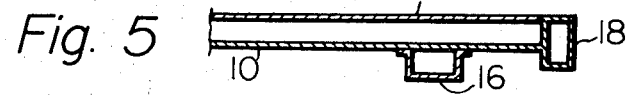
FIG. 5 is a cross section view taken along the plane designated by the line V—V in FIG. 3 showing the constructional members connected.

FIGS. 3 to 5 show a first embodiment of this invention. A front floor member 10 has a central ridge extending in the longitudinal direction, and a cross member 12 is secured onto the upper surface of the front floor member 10 and extending in the lateral direction, both members together constituting a rigid right-angled reinforcement. Also shown are a fire wall or dashboard panel 14 and two dash side members 16, the panel extending vertically downwardly and then turning horizontally so as to join the front floor member 10 in a horizontal plane, and the members being secured onto the under surface of the front floor member 10 separated from each other at a certain distance and extending in the longitudinal direction to an extent enough to reach the cross member 12 above the front floor member 10, both members being secured together so as to constitute a rigid reinforcement construction of box-shaped cross section. In addition, there are also provided a pair of front floor side members 18 of box-shaped cross section and secured to the lateral sides of the front floor member 10 and the dashboard panel 14, to which both ends of the cross member 12 are secured to form a right-angled reinforcement. In such a unitized floor construction of a vehicle cabin, although there is no illustration in the accompanying drawings, the tail ends of the dash side members 16 may be designed to further extend to such an extent that they reach another cross member secured on the under surface of a center floor member, thus forming another right-angled reinforcement.

According to the above described unitized floor construction of this invention, as the two dash side members 16 extend across the cross member 12 under the front floor section of the cabin and are secured thereto, the rigidity of the entire front floor member 10 is increased. Furthermore, the dash side members 16 form a rigid-angled joint of box-shaped cross section together with the cross member 12 in the front floor section, in both upper and under surfaces thereof, and the cross member 12 being further secured immediately to the front floor side members 18, thus additionally improving the rigidity of the front floor construction of the vehicle body against buckling and/or torsional stresses applied thereupon.

In a head-on collision of a motor vehicle the impact forces applied on the dashboard penel 14 may be counteracted by the above-mentioned dash side member 16, and the impact forces applied directly on the dash side members 16 may be cooperatively shared by the cross member 12 and the front floor side members 18, thus preventing the deformation and/or buckling of the vehicle body and assuring passenger safety.

Figure 6:
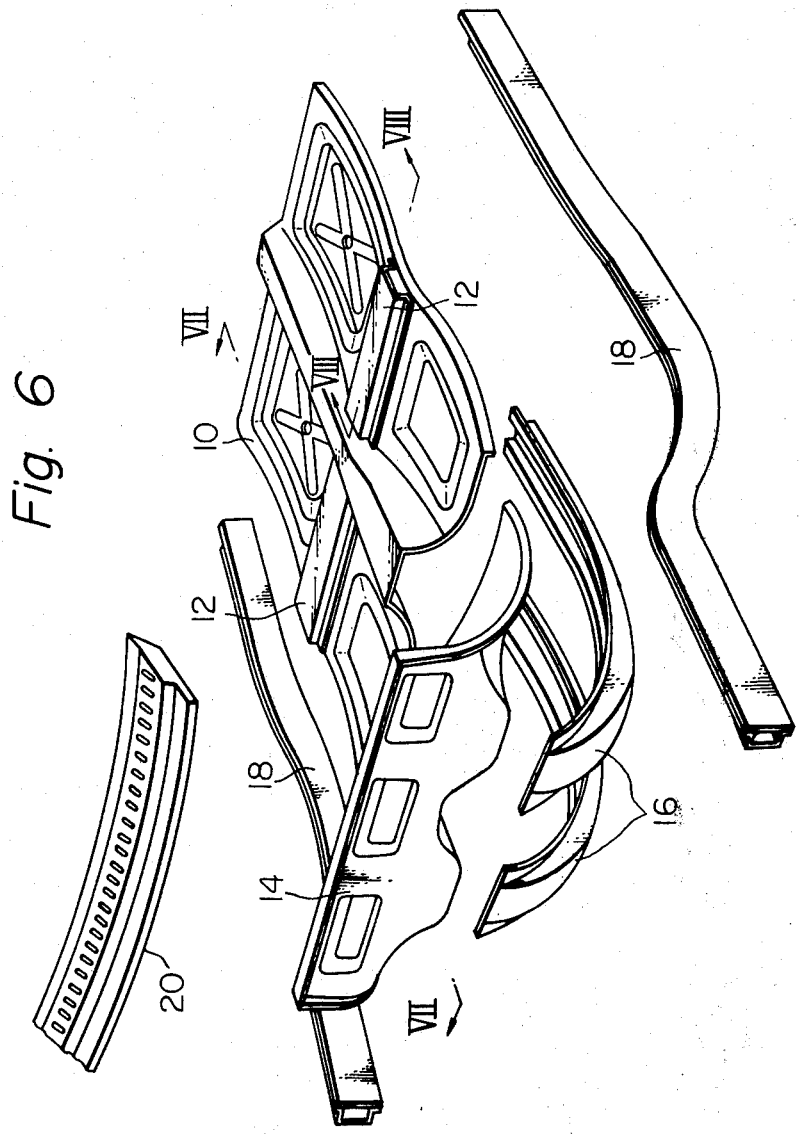
FIG. 6 is an exploded perspective view showing a second preferred embodiment of front floor members of a motor vehicle according to this invention.
Figure 7:
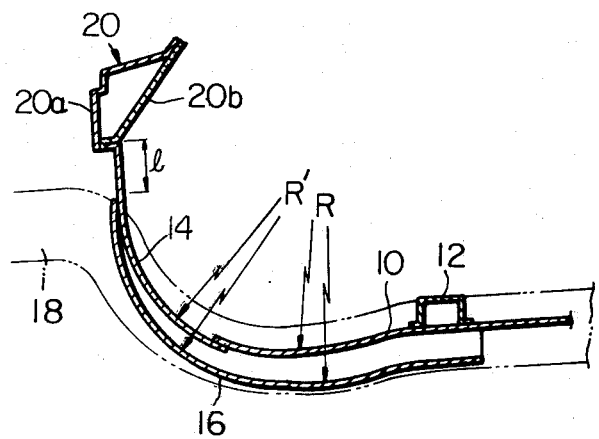
FIG. 7 is a longitudinal section view taken along the plane designated by the line VII—VII in FIG. 6 showing the general arrangement of the front floor members of FIG. 6.
Figure 8:
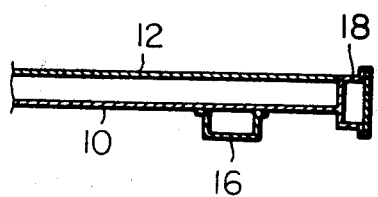
FIG. 8 is a cross section view taken along the plane designated by the line VIII—VIII in FIG. 6 showing the constructional members connected.
Figure 9:
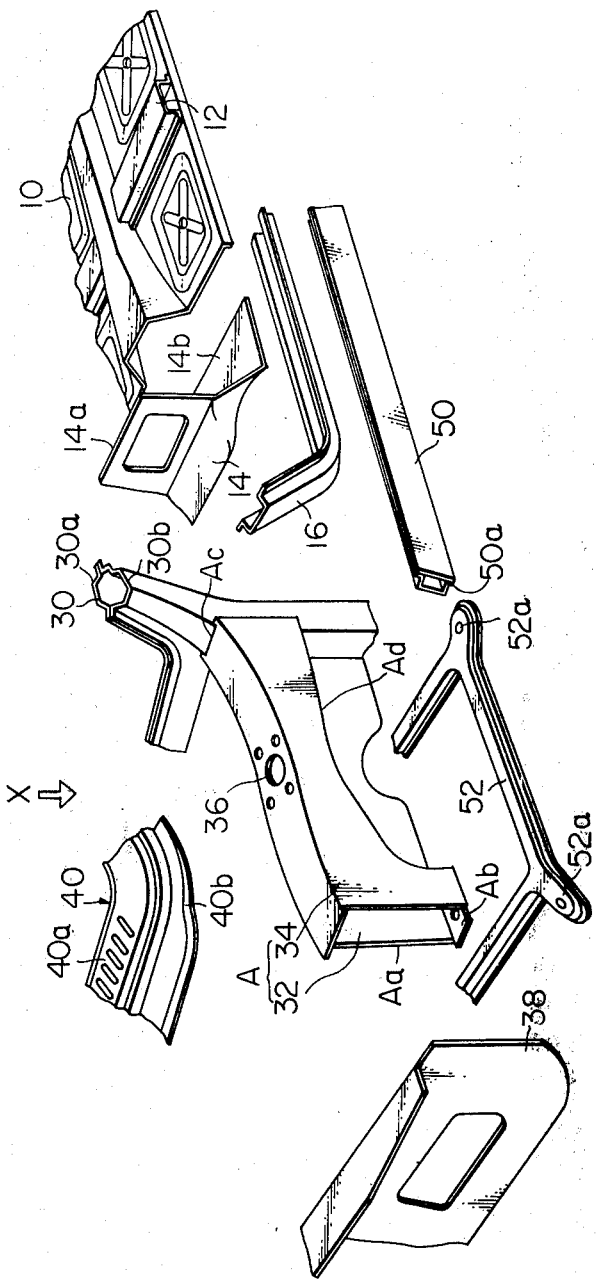
FIG. 9 is an exploded perspective view showing a modification of side reinforcing members of a motor vehicle according to this invention.
Figure 10:
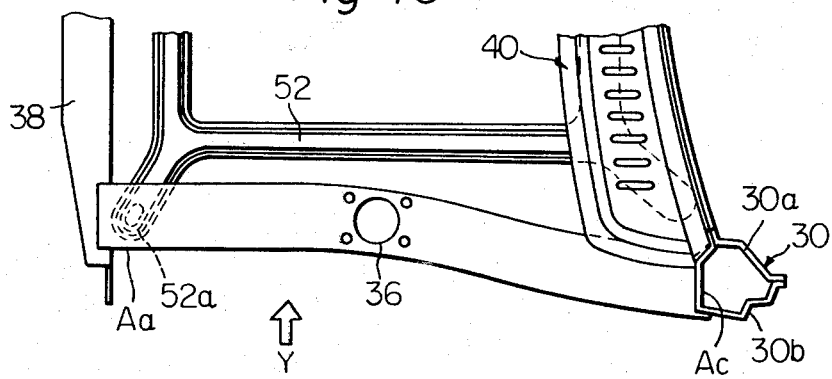
FIG. 10 is a fragmentary plan view showing the general arrangement of the side reinforcing members seen from the direction indicated by the arrow "X" in FIG. 9.
Figure 11:
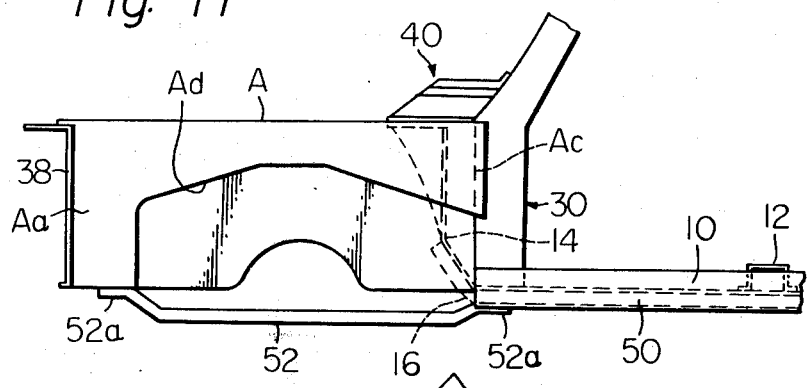
FIG. 11 is a side view showing the general arrangement of the side reinforcing members seen from the direction indicated by the arrow "y" in FIG. 10.
Figure 12:
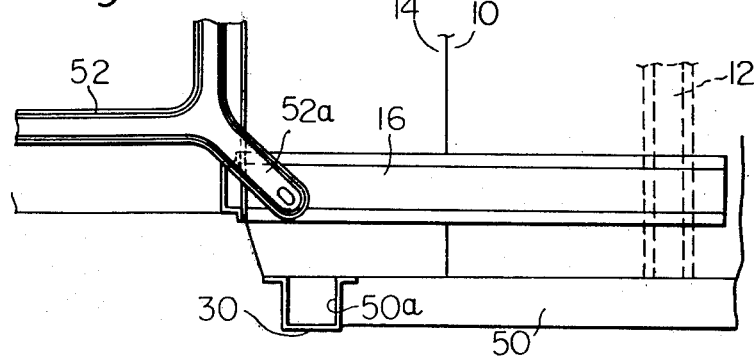
FIG. 12 is a top plan view showing the joint portions of the side reinforcing members seen from the direction indicated by the arrow "Z" in FIG. 11.

The longitudinal section shape of the side members 16 may be modified as shown in the second preferred embodiment of this invention. Referring now to FIGS. 6 to 8, there are shown a front floor member 10 formed with a curvilinear cross section having an appropriate curvature R in concavity toward the inside of the cabin and a dashboard panel 14 formed with a curvilinear cross section having a curvature R' likewise toward the inside of cabin and secured to the above-mentioned front floor member 10. In addition, there are shown two dash side members 16 secured onto the under surface of the dashboard panel 14 and separated from each other at a certain distance on the under sides thereof, which are also formed with such a curvature so as to exactly fit with the curvatures R and R' of the front floor member 10 and the dashboard panel 14, respectively, and further these dash side members 16 extend to such an extent enough to reach the cross member 12 which is secured on the upper surface of the front floor member 10 so that the tail ends of the dash side members 16 may be rigidly joined with the cross member to provide a reinforcing construction of a box-shaped cross section under the front floor member 10 and a right-angled cross joint of box-shaped cross section with the cross member 12. The leading ends of the dash side members 16 are closed with a gradually shallowing groove therein, extending up to the lower end of a vertically hanging portion of the dashboard panel 14 to be secured rigidly over the dashboard panel. Along with the curvature of the front floor member 10, a part of two front floor side members 18 secured on the lateral sides of the front floor member 10 may be formed with a curvature R so that the front side members 18 may coincide at least partly with the curvature R of the front floor member when assembled therewith. Incidentally, in this second embodiment of the invention, it is required that a distance $l$ from the lower end of the joint section of the dashboard panel 14 with the dash side member 16 to the lower end of a cowl box 20 should be appropriately selected so that the distance $l$ may not become a weak link in the rigidity of such box construction. This cowl box construction may be modified with such an alternative wherein a lower member 20b of the cowl box 20 is substituted by an appropriate extension of the dashboard panel 14.

According to the second embodiment of this invention as described above the front floor member 10 and the dashboard panel 14 are likewise formed with curvatures in a concave fashion toward the inside of the passenger cabin thus eliminating discontinuity as experienced in the conventional design in the rigid construction from the dashboard panel through to the front floor member. By virtue of such construction, there occurs no stress concentration in the front floor section in a collision of the vehicle and such stresses may be effectively dispersed to the constructional members cooperating adjacent thereto so that a deformation or buckling of such constructional members may be prevented or minimized. Moreover, the two dash side members 16 extending to reach the cross member 12 so that there is formed a right-angled cross joint both in the upper surface and the under surface of the front floor section, and the above-mentioned cross member 12 is crosswise secured to the front floor side member 18 to form an entirely integral connection of such longitudinal and lateral reinforcing members, consequently resulting in a remarkable improvement in the rigidity of the front floor construction against bending and torsional stresses in either the longitudinal direction or in the lateral direction.

When external forces are applied in the longitudinal direction in a head-on collision, for instance, the major part of such forces of stresses is shared by the front floor member 10 and the dash side members 16, and the forces applied on the dash side members 16 are further shared by side sills (not shown) of the body through the front floor side members 18. When external forces act in the vertical direction of the vehicle body, such forces or stresses are cooperatively shared by the dashboard panel 14 and by the generally upright parts of the dash side members 16. By such cooperative function of the constructional members in the front floor section of the vehicle, deformation or buckling of the passenger cabin due to such stresses may be minimized as practicably as possible so that a survival space for the passengers can be maintained.

In a third embodiment of this invention, two front pillars are provided to disperse a great impact force generally in the vertical direction of the vehicle body, and simultaneously to absorb a portion of the force through substantial plastic deformation of such pillars. For more details, the component of such impact force applied on the upper part of the body is compensated by such lateral reinforcing members as the front pillars extending in the vertical direction in the front part of the cabin, while the component of such forces applied on the lower portion of the body is compensated by the dash side member located beneath the dashboard panel to cushion or diminish the transmission of such impact forces to the vehicle body, and thus to minimize the deformation of the cabin and to assure the safety of the passengers.

Referring now to FIGS. 9 to 12, there is shown only one side of two front pillars 30 composed of an inner panel 30a and an outer panel 30b of a polygonal cross section, a hoodridge panel 32 secured to the front pillars 30 and a front bulk head 38 disposed in the lateral direction in the front end position of the body, a suspension member plate 34 secured to the hoodridge panel defining a polygonal section and constituting a reinforcing member A with the hoodridge panel. One end Ac of the reinforcing member A is secured to the outer panel 30b of the front pillars 30, while the other end Aa thereof is secured to the front bulk head 38, and the extended end of the suspension member plate 34 is bent and secured to the lower end of the hoodridge panel 32 so as to define a mounting surface Ab.

In the central upper portion of the suspension member plate 34 there is provided a bracket 36 for a strut suspension member (not shown), and the central portion thereof corresponding to the bracket defines a lower side portion Ad with a gradual reduction in the vertical dimension from both front and rear ends thereof so as to provide flexibility or fragility against the stresses applied thereto to effectively absorb shock loads, as described in details hereinafter.

There is also shown a part of a cowl top member or style strip 40 which covers an inlet port to the cabin ventilator or heater, and provides mounts for the windshield wipers, and to which secured are a cowl grill 40a and a cowl lower panel 40b defining a chamber of a polygonal cross section. The elements 40, 40a and 40b are secured onto the above-mentioned reinforcing member A while extending partly to the front pillar 30, thus forming a unitized reinforcing submember in the upper portion of the vehicle body which provides rigidity against stresses applied in the lateral direction.

As in the preferred embodiments described hereinbefore, there are two dash side members 16 extending to the cross member 12 disposed in parallel separate positions under the dashboard panel 14, and secured thereto. The reference numeral 50 designates one of two side sills disposed along the lateral sides of the front floor member extending in the longitudinal direction, the leading end 50a of which is secured to the lower portion of the front pillar 30 and the lateral side thereof being secured to the cross member 12.

There is also shown a sub-frame 52 of a rectangular shape to support the engine of the vehicle, which sub-frame is provided with brackets 52a at the four corners thereof for connection to the vehicle body. The front brackets 52a of the sub-frame 52 are secured on the mounting surface Ab provided in the lower end of the reinforcing member A and the rear brackets 52a thereof are secured to the lower portions of the above-mentioned dash side members 16.

According to the above described construction of the constituent reinforcing members of this invention, advantages are attained in comparison with the conventional reinforcing construction of the vehicle body, i.e.;

1. By virtue of such arrangement that one end of the reinforcing member A of polygonal cross section is secured to the front pillars 30 and the other end thereof extending downwardly is secured in the longitudinal direction to the front bulk head 38, it is possible to attain further improved rigidity of the vehicle body in a practical way.

2. By virtue of such arrangement that the reinforcing member A of polygonal cross section is provided in the longitudinal direction, the cowl top member adding rigidity in the lateral direction, and the front pillar 30 of polygonal cross section resisting stresses applied in the vertical direction, and further such constituent members cooperating with each other further improved rigidity of the vehicle body is attained against buckling and/or torsional deformation.

3. In a head-on collision of the vehicle, the impact forces from such collision are effectively dispersed by the reinforcing member A in the upper portion of the body and by the sub-frame 52 in the lower portion of the body, respectively, and the impact energies are absorbed through plastic deformation of such constituent members according to their individual rigidity. The forces applied on the upper portion of the body are relayed to the front pillar 30 of rigid construction, and the forces applied on the lower portion of the body are conveyed to the dash side members 16, further to the side sills 50 in the floor construction through the cross member 12, thus cushioning or damping the transmission of the shocks to the passenger cabin and assuring the safety of the passengers. Particularly in the reinforcing member A, by virtue of the central shallow section thereof which may become a section yielding to predetermined stresses applied thereupon, it can readily buckle or otherwise deform without difficulty, and therefore it can absorb effectively impact energies.

4. By virtue of the reinforcing member A which is immediately secured to the front pillar 30 and the cowl top member 40 prefabricated with the cowl grill 40a and the lower panel 40b, it may readily be assembled, thus contributing to a curtailment of the manufacturing steps of the entire vehicle cabin.

As fully described in the foregoing typical embodiments of this invention, this invention is essentially intended for providing the reinforcing and shock absorbing members applicable to the construction of the passenger cabin, and this reinforcing shock absorbing construction can provide such advantages and effects as summarized above.

What is claimed is:

1. In a body structure for a motor vehicle driven by an engine, the combination comprising a pair of transversely spaced, vertically extending front pillers; a pair of transversely spaced, longitudinally extending front floor side members secured to said front pillers and extending rearwardly therefrom; a front floor member mounted between said front floor side members and forming a part of a passenger cabin; a dashboard panel separating the passenger cabin from an engine room; a cross member transversely extending between and connected to said front floor side members and to said front floor member; a pair of transversely spaced, longitudinally extending dash side members, said dash side members being secured to said dashboard panel at front portions of said dash side members and also secured to said front floor member at rear portions of said dash side members, said dash side members extending longitudinally to positions to cross said cross member such that impact shocks transmitted to the dash side members are transmitted through the floor panel to the cross member; a pair of transversely spaced, longitudinally extending reinforcing members connected at their rearward portions to said front pillers; a sub-frame provided in front of said dashboard panel to support the engine thereon, said sub-frame being connected at its front portion to said reinforcing member and at its rearward portion to said dash side members so that impact shocks are delivered simultaneously to the dash side members and the front pillars.

2. The combination according to claim 1, further comprising a transversely extending front bulk head connected to the front portions of said reinforcing members.

3. The combination according to claim 1, further comprising a transversely extending cowl top member connected to said front pillers.

* * * * *